US008861898B2

(12) United States Patent
Candelore et al.

(10) Patent No.: US 8,861,898 B2
(45) Date of Patent: Oct. 14, 2014

(54) CONTENT IMAGE SEARCH

(75) Inventors: Brant Candelore, San Diego, CA (US); Robert Hardacker, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1276 days.

(21) Appl. No.: 11/724,885

(22) Filed: Mar. 16, 2007

(65) Prior Publication Data

US 2008/0226119 A1   Sep. 18, 2008

(51) Int. Cl.
*G06K 7/00* (2006.01)
*G06K 9/20* (2006.01)
*G06F 17/30* (2006.01)

(52) U.S. Cl.
CPC .... *G06F 17/30256* (2013.01); *G06F 17/30796* (2013.01); *G06F 17/30265* (2013.01); *G06F 17/30831* (2013.01); *G06F 17/3079* (2013.01)
USPC ........................................ 382/312

(58) Field of Classification Search
None
See application file for complete search history.

(56) References Cited

U.S. PATENT DOCUMENTS

| | | | | |
|---|---|---|---|---|
| 6,826,443 | B2 * | 11/2004 | Makinen | 700/121 |
| 7,062,068 | B2 * | 6/2006 | Hirai et al. | 382/100 |
| 2002/0015514 | A1 * | 2/2002 | Kinjo | 382/118 |
| 2002/0042920 | A1 * | 4/2002 | Thomas et al. | 725/87 |
| 2003/0044062 | A1 * | 3/2003 | Ganapathy et al. | 382/165 |
| 2004/0151374 | A1 * | 8/2004 | Lipton et al. | 382/181 |
| 2005/0008246 | A1 * | 1/2005 | Kinjo | 382/254 |
| 2005/0025357 | A1 * | 2/2005 | Landwehr et al. | 382/170 |
| 2007/0003143 | A1 * | 1/2007 | Wakai | 382/187 |
| 2008/0069480 | A1 * | 3/2008 | Aarabi et al. | 382/305 |
| 2008/0181536 | A1 * | 7/2008 | Linden | 382/313 |
| 2009/0144248 | A1 * | 6/2009 | Treadgold et al. | 707/3 |
| 2009/0147990 | A1 * | 6/2009 | Lev | 382/100 |
| 2009/0180697 | A1 * | 7/2009 | Erol et al. | 382/218 |
| 2010/0092093 | A1 * | 4/2010 | Akatsuka et al. | 382/203 |
| 2010/0111377 | A1 * | 5/2010 | Monroe | 382/118 |

OTHER PUBLICATIONS

Flickner et al, "Query by Image and Video Content: The QBIC System", Sep. 1995, IEEE, pp. 23-32.*
Stix, Gary "A Farewell to Keywords", Scientific American, Jul. 2006, pp. 90-93.

* cited by examiner

*Primary Examiner* — Randolph I Chu
(74) *Attorney, Agent, or Firm* — John L. Rogitz

(57) ABSTRACT

An embodiment of the present invention includes a search technique for image query. A region of interest (ROI) containing an image in a scene of a displayed content is captured. The ROI is analyzed locally or remotely to search for related content associated with the image. The related content is received.

28 Claims, 8 Drawing Sheets

CONTENT IMAGE SEARCH

BACKGROUND

1. Field of the Invention

Embodiments of the invention relate to the field of search engines, and more specifically, to content image search.

2. Description of Related Art

Search engines have been popular to retrieve information over the Internet in response to queries entered by a user. The retrieved information may be in the form of textual documents, a Hypertext Markup Language (HTML) page, an image, or a video clip. However, the queries are mostly in textual form entered as a keyword or keywords. In many applications, textual keywords may be inadequate or insufficient for searching. In some cases, the user may not even know the proper keywords to use. For example, the user may be watching a video content on a television and may be interested to retrieve information, either visual or textual, related to a particular image or a portion of an image shown on the display screen. The user may not know how to describe the image in textual form, or may not have an easy way to input this information into a text field (e.g., no keyboard when watching the TV).

Existing techniques for searching content images using a query image have a number of drawbacks. One technique takes a snapshot of a picture by a cell phone and sends the image to a server via the Web. The query image is separated into triplets. These triplets are then matched with those in a table containing a database of the training images. This technique does not work for content broadcast via a broadcast channel. It also requires the availability of an image database of training images which may be limited in size. In addition, the technique does not work for all types of images. Another technique combines modules for detecting 27 features of adult pictures and determines whether an image has an adult content so that it may be filtered out. This technique only examines the images returned by an image search. It does not use an image query for searching.

BRIEF DESCRIPTION OF THE DRAWINGS

Embodiments of the invention may best be understood by referring to the following description and accompanying drawings that are used to illustrate embodiments of the invention. In the drawings.

DESCRIPTION

Figure 1A:
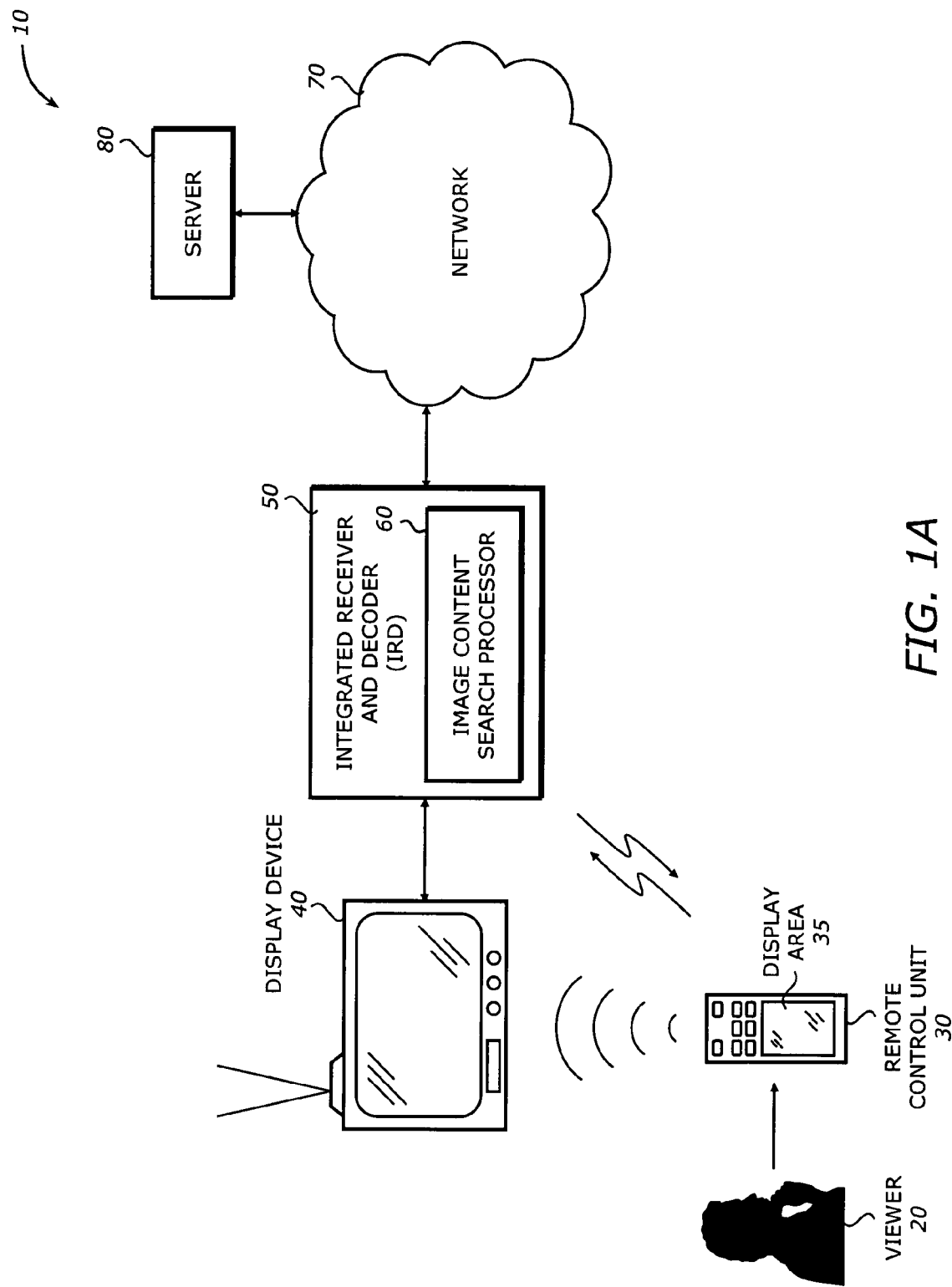
FIG. 1A is a diagram illustrating a system in which one embodiment of the invention can be practiced.

An embodiment of the present invention includes a search technique for image query. A region of interest (ROI) containing an image in a scene of a displayed content is captured. The ROI is analyzed locally or remotely to search for related content associated with the image. The viewer may then receive the related content.

In the following description, numerous specific details are set forth. However, it is understood that embodiments of the invention may be practiced without these specific details. In other instances, well-known circuits, structures, and techniques have not been shown in order not to obscure the understanding of this description.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

Embodiments of the invention include a technique to provide related content associated with an image captured on a scene of a displayed content. The related content is of interest to the viewer who is viewing the displayed content. The displayed content may be from a broadcast content or a package media. A region of interest (ROI) containing the image is captured by highlighting an object in the scene using a wireless pointing device and selecting an area encompassing the object to correspond to the ROI. The capturing of the ROI may also be done automatically using a pre-defined area of ROI (e.g., center of screen) for disable mode of operation. The disable mode of operation may be useful for parental control where the broadcast content is passively analyzed to determine if adult material is being viewed. The ROI is then analyzed locally or remotely to search for the related content associated with the image. For local analysis, the image features of the image in the ROI are selected or extracted. The extracted image features are then matched with indexing features in a database. The indexing features index the related content in the database. For remote analysis, the ROI is transmitted over a network to a server for analysis. The server returns the related content. To help further the analysis, ancillary information associated with the scene may be employed. The ancillary information may include at least one of metadata, caption, electronic program guide (EPG) data, content provider information, link to a Web site which may direct the user to a related Web site (e.g., official fan site for an actor identified in the ROI, company Web site for an identified product), timing information between scene changes, and audio segment which may allow not only identification of the program but also where in the program the viewing is currently happening. For remote analysis, the ancillary information may be transmitted together with the ROI to the server. The image in the ROI may be analyzed using optical character recognition (OCR) techniques if it contains textual information used to help identifying the image.

The related content may be displayed on the displayed content using one of a Picture-in-Picture (PiP) mode, a graphic overlay, and a transparency display. It may be displayed side-by-side to the displayed content in an area of the screen unused by the content, e.g., to the side or below the main viewing image. Or it may also be displayed on a wireless device having a display such as a cell phone, a remote control unit, or a hand-held device.

The related content provides information that is of interest to the viewer. It may be an advertisement of a product that is related to the image in the ROI. It may contain further information on the extracted image such as identification of an object (e.g., car, historical site, geographical point-of-interest, name of actors), additional information of the object (e.g., biography of an actor, product endorsements, location), etc. The related content may also contain queries to the viewer to determine the exact information the viewer is looking for. Upon viewing the queries, the viewer may provide further request to receive more specific information.

FIG. 1A is a diagram illustrating a system 10 in which one embodiment of the invention can be practiced. The system 10 includes a viewer 20, a remote control unit 30, a display device 40, an integrated receiver and decoder (IRD) 50, a network 70, and a server 80. Note that the system 10 may contain more or less elements than the above.

The viewer 20 is a user who views a displayed content displayed on the display device 40. The displayed content may be a broadcast content or a package media. The broadcast content may be any content that is broadcast to the viewing public. It may be a television program, an on-demand content, a pay-per-view program, or any content that is delivered to the viewer via any broadcast medium such as radio frequency, cable network, satellite transmission, networks (e.g., Internet), etc. While viewing a broadcast program, the viewer 20 may be interested in additional information regarding an item, an image, or an object shown in a scene of the broadcast content. The package media may include sources such as Digital Versatile Disk (DVD), High Definition (HD) DVD, or any other media.

The remote control unit 30 is an input entry or pointing device that may generate key events to interact with the display device 40 and the IRD 50. It may have entry means such as buttons or keypad to allow the viewer 20 to enter commands or to select an operation. It may also have a display area 35 to display menu items, keypad, or graphical or textual data returned by the IRD 50. The viewer 20 may select or enter a command to perform operations such as selecting menu items or performing audio and/or video operations (e.g., play, pause, stop, fast review, fast forward). In particular, the remote control unit 30 may have commands to allow the viewer 20 to select a region of interest (ROI) on a scene 45 displayed on the display device 40 for image query or search. The remote control unit 30 may have a built-in wireless interface or transmitter to transmit key events in a wireless connectivity such as optical (e.g., infra-red), sonic (e.g., ultrasound), and electromagnetic (e.g., Bluetooth).

In this embodiment, the display device 40 may be any devices that display media data including broadcast content. They may be television (TV) sets, or display monitors. The display type may include any display type such as high definition TV (HDTV), cathode ray tube (CRT), flat panel display, plasma, liquid crystal display (LCD), etc. The display device 40 displays the scene 45 on its display screen.

The IRD 50 may be a controller or a set-top box that is connected to the display device 40 to control the receiving of content or programs delivered or downloaded for viewing. The IRD 50 has wireless connectivity to interact with the viewer 20 via the remote control unit 30. The IRD 50 may include an electronic program guide (EPG) that may be displayed on the display device 40 to allow the viewer 20 to select a program, to record a future program, etc. The IRD 50 may have buffer memory to store ancillary information (e.g., metadata) associated with the content being viewed. The IRD 50 includes an image content search processor 60. The image content search processor 60 interacts with the viewer 20 to allow the viewer 20 to capture an image on the scene 45 and search for related content associated with the captured image. The image content search processor 60 has interface to the network 70. It may also have a disable mode of operation that may disable the broadcast content for parental control.

The network 70 is any network that allows the IRD 50 to have access to the server 80. It may be a local area network (LAN), a wide area network (WAN), an intranet, an extranet, a Wireless Fidelity (Wi-Fi) network, or the Internet. The network connection may be wired or wireless. The server 80 may be any server connected to the network 70 to receive the search query from the image content search processor 60. The server 80 typically has access to search engines such as Google, Yahoo, etc. The server 80 may also be equipped with specialized search capabilities of its own (e.g., visual search) to analyze the search query before submitting the query, for text, to the search engines. The server 80 may have a communication facility to communicate with the IRD 50 such as returning the search results in the form of related content.

It is noted that the embodiment shown in FIG. 1A is for illustrative purposes only. Other configurations may be possible. For example, the image content search processor 60 may be integrated into the display device 40. The display device 40 may have enhanced capabilities such as processing power, buffer memory, network interface, etc. In addition, for package media (e.g., DVD) viewing, the IRD 50 may not be needed.

Figure 1B:
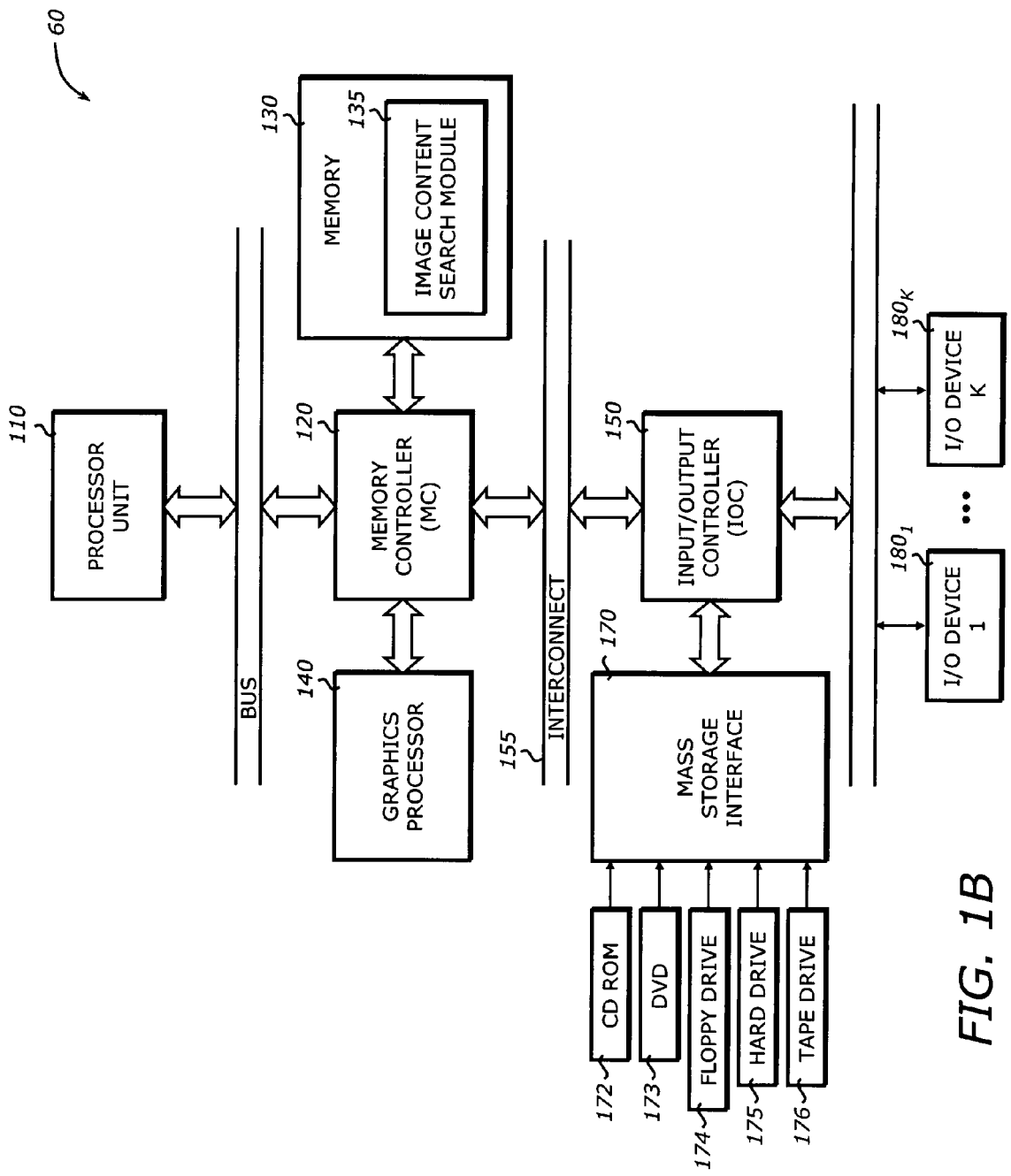
FIG. 1B is a diagram illustrating an image content search processor according to one embodiment of the invention.

FIG. 1B is a diagram illustrating the image content search processor 60 shown in FIG. 1A according to one embodiment of the invention. The image content search processor 60 includes a processor unit 110, a memory controller (MC) 120, a main memory 130, a graphics processor 140, an input/output controller (IOC) 150, an interconnect 155, a mass storage interface 170, and input/output (I/O) devices 180$_1$ to 180$_K$. Additional components may include a tuner, an on-display processor, etc. These components may belong to the IRD 50 or integrated with the image content search processor 60.

The processor unit 110 represents a central processing unit of any type of architecture, such as processors using hyper threading, security, network, digital media technologies, single-core processors, multi-core processors, embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The MC 120 provides control and configuration of memory and input/output devices such as the main memory 130 and the IOC 140. The MC 120 may be integrated into a chipset that integrates multiple functionalities such as graphics, media, isolated execution mode, host-to-peripheral bus interface, memory control, power management, etc. The MC 120 or the memory controller functionality in the MCH 120 may be integrated in the processor unit 110. In some embodiments, the memory controller, either internal or external to the processor unit 110, may work for all cores or processors in the processor unit 110. In other embodiments, it may include different portions that may work separately for different cores or processors in the processor unit 110.

The main memory 130 stores system code and data. The main memory 130 is typically implemented with dynamic random access memory (DRAM), static random access memory (SRAM), or any other types of memories including those that do not need to be refreshed. The main memory 130 may include multiple channels of memory devices such as DRAMs. The main memory 130 may include an image content search module 135. The image content search module 135 includes program instructions and data to perform local or remote image search functions.

The graphics processor 140 is any processor that provides graphics functionalities. The graphics processor 140 may also be integrated into the MC 120 to form a Graphics and Memory Controller (GMC). The graphics processor 140 may be a graphics card such as the Graphics Performance Accelerator (AGP) card, interfaced to the MC 120 via a graphics port such as the Accelerated Graphics Port (AGP) or a peripheral component interconnect (PCI) Express interconnect. The graphics processor 140 provides interface to an external display device such as standard progressive scan monitor, television (TV)-out device, and Transition Minimized Differential Signaling (TMDS) controller.

The IOC 150 has a number of functionalities that are designed to support I/O functions. The IOC 150 may also be integrated into a chipset together or separate from the MC 120 to perform I/O functions. The IOC 150 may include a number of interface and I/O functions such as peripheral component interconnect (PCI) bus interface, processor interface, interrupt controller, direct memory access (DMA) controller, power management logic, timer, system management bus (SMBus), universal serial bus (USB) interface, mass storage interface, low pin count (LPC) interface, wireless interconnect, direct media interface (DMI), etc.

The interconnect 155 provides interface to peripheral devices. The interconnect 155 may be point-to-point or connected to multiple devices. For clarity, not all interconnects are shown. It is contemplated that the interconnect 155 may include any interconnect or bus such as Peripheral Component Interconnect (PCI), PCI Express, Universal Serial Bus (USB), Small Computer System Interface (SCSI), serial SCSI, and Direct Media Interface (DMI), etc. The image content search processor 60 may also obtain content from a Digital Video Interface (DVI) or High Definition Multimedia Interface (HDMI), Red Green Blue (RGB), or Luminance, Blue, and Red Components (YPbPr) interface.

The mass storage interface 170 interfaces to mass storage devices to store archive information such as code, programs, files, data, and applications. The mass storage interface may include SCSI, serial SCSI, Advanced Technology Attachment (ATA) (parallel and/or serial), Integrated Drive Electronics (IDE), enhanced IDE, ATA Packet Interface (ATAPI), etc. The mass storage device may include compact disk (CD) read-only memory (ROM) 172, digital versatile disc (DVD) 173, floppy drive 174, hard drive 175, tape drive 176, and any other magnetic or optic storage devices. The mass storage device provides a mechanism to read machine-accessible media.

The I/O devices $180_1$ to $180_K$ may include any I/O devices to perform I/O functions. Examples of I/O devices $180_1$ to $180_K$ include controller for input devices (e.g., keyboard, mouse, trackball, pointing device, remote control unit), media card (e.g., audio, video, graphic), network card, and any other peripheral controllers. The network card allows the image content search processor 60 to have access to the network 70.

Figure 2:
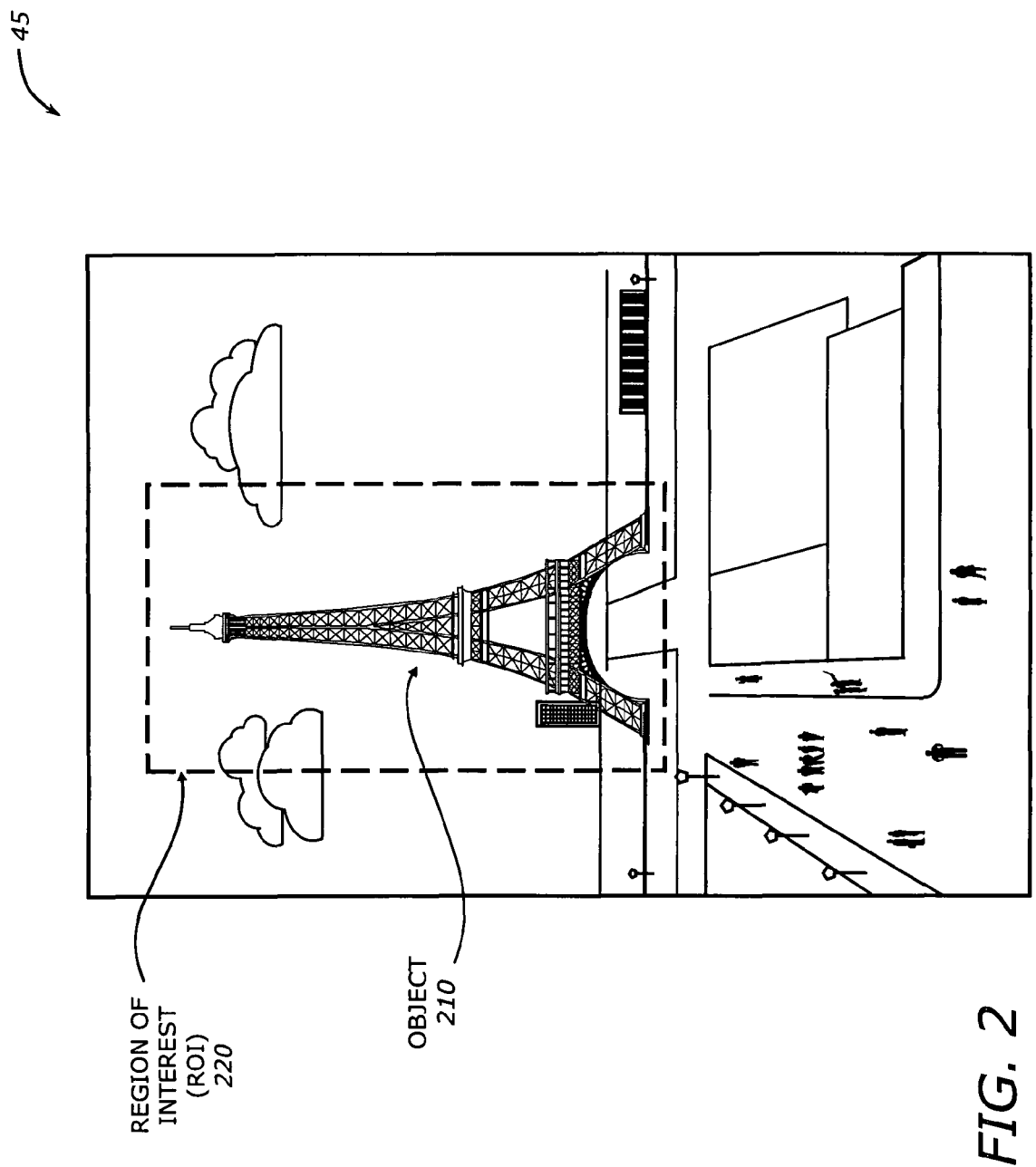
FIG. 2 is a diagram illustrating a scene of a broadcast content according to one embodiment of the invention.

FIG. 2 is a diagram illustrating the scene 45 of a broadcast content according to one embodiment of the invention. The scene 45 is displayed on the display device 40 as viewed by the viewer 20. It may contain an object 210 and a region of interest (ROI) 220.

The viewer 20 may be interested in obtaining more information about the image contained in the ROI 220. He or she may use the wireless pointing device or the remote control unit 30 to capture the ROI 220 and use it as a query for search for related content. The content is in the presentation buffer of the graphics processor. This box may be rendered on screen and provide feedback for the viewer 20. The viewer 20 captures the ROI 220 by first highlighting the object 210 in the scene 45. Using the remote control unit 30 involves rendering a box around the content of interest in the presentation buffer of the graphics processor 140. The object 210 may typically be at the center of the ROI 220. The viewer 20 using the pointing device may create the box by clicking, holding down on the button and dragging the cursor over the area encompassing the object 210 to correspond to the ROI 220 and then letting go of the button. Any other ways to define, create, or form the box may be used.

The remote control unit 30 may interact with the image content search processor 60 to adjust the size of the ROI 220 to cover the image of interest. In this example, the viewer 20 may wish to obtain the name of the tower shown in the scene. The ROI 220 covers a rectangular area enclosing the tower. The shape of the ROI 220 may be any shape and may be selected by the viewer 20. The shape of the ROI 220 may be square, rectangle, circle, oval, ellipse, polygon, or any regular or irregular shape as selected by the viewer 20.

After the ROI 220 is captured, the viewer 20 may click another button or enter a command to start analyzing the image contained in the ROI to search for related content. In this case, the related content may be the name of the tower (e.g., the Eiffel tower) or the name of the geographical location (e.g., Paris) that has the tower.

In one embodiment, a pre-analysis operation may be performed locally on the image contained in the ROI 220 to facilitate the search or query. For example, the ROI 220 may contain textual information consisting of characters or letters. The viewer 20 may select a pre-analysis optical character recognition (OCR) operation to recognize the textual information if the textual information helps identifying the image in the ROI 220. This textual information may then become a search query. For example, the scene of the broadcast content may be a paid program or advertisement on a product. The product name may be displayed on the product. The viewer 20 may then select the ROI 220 to contain the product name as displayed on the screen. It may be determined that the ROI 220 is an ad for a particular product. The viewer 20 therefore has the convenience of obtaining the information on the product immediately without writing down the product name for later search.

Figure 3:
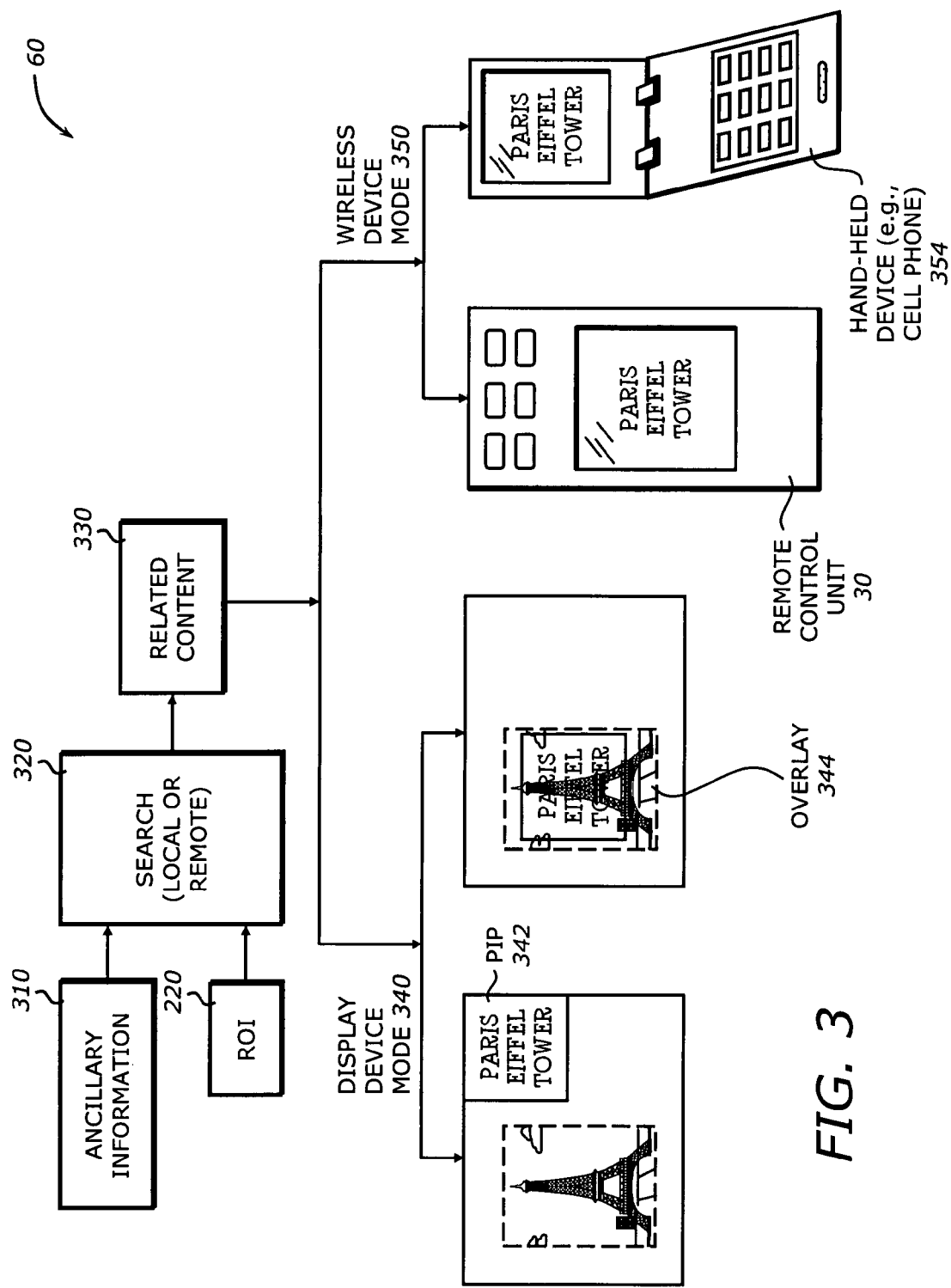
FIG. 3 is a diagram illustrating processing blocks of the image content search processor according to one embodiment of the invention.

FIG. 3 is a diagram illustrating processing blocks of the image content search processor according to one embodiment of the invention. The processing blocks of the image content search processor 60 include the ROI 220, ancillary information 310, search 320, and related content 330.

The ROI 220 is captured by the viewer 20 as illustrated in FIG. 2. In addition, the image content search processor 60 may obtain ancillary information associated with the scene 45 that contains the ROI 220. The ancillary information 310 may be available through other contextual data and sources such as metadata, EPG information, etc. The ancillary information 310 may help further refining the search or narrowing the search space.

The search 320 may be local or remote. The search 320 uses the image contained in the ROI 220 as the query together with the ancillary information 310 if such information is available. A local search provides the search locally. This may be done within the IRD 50 itself or by a local sub-system or server that is connected directly to the IRD 50. The IRD 50 or the image content search processor 60 may have interface to a database which contains encyclopedic information. A remote search provides the search remotely by the server 80 via the network 70. The search 320 may return a number of search results. The search results may be filtered or selected by the image content search processor 60. The filtering or selection criteria may be tailored according to the viewer's preferences based on established criteria or based on history of usage.

The related content 330 represent a search result that is returned by the search 320. The format of the related content 330 may be graphical or textual. It basically contains the content that is related and associated with the image contained in the ROI 220. It may contain a query or a menu to ask the viewer 20 to select more search options or to narrow the search results further. The viewer 20 may receive the related content 330 in a number of ways. The related content 330 may be shown to the side or below the main viewing image. The related content 330 may be displayed using a display device mode 340 or a wireless device mode 350.

The display device mode 340 displays the related content 330 on the display device 40. The display may be a Picture-in-Picture (PiP) display 342 or an overlay display 344. The PiP display 342 shows the related content 330 as a small picture occupying an area on the display screen, usually at the corner of the screen. It may replace content in the main display and is depicted as if it were outside the viewing area. The overlay 344 shows the related content 330 overlaid on the ROI 220. Transparency may be employed so that the portion of the ROI 220 underneath the related content 330 may be visible.

The wireless device mode 350 displays the related content 330 on a wireless device other than the display device 40 so that the broadcast content may be viewed without interruption. The wireless device on which the related content 330 is displayed may be the remote control unit 30 or a hand-held device 354. The hand-held device 354 may be a cellular phone, a personal digital assistant, or any other wireless hand-held device having a display.

Figure 4:
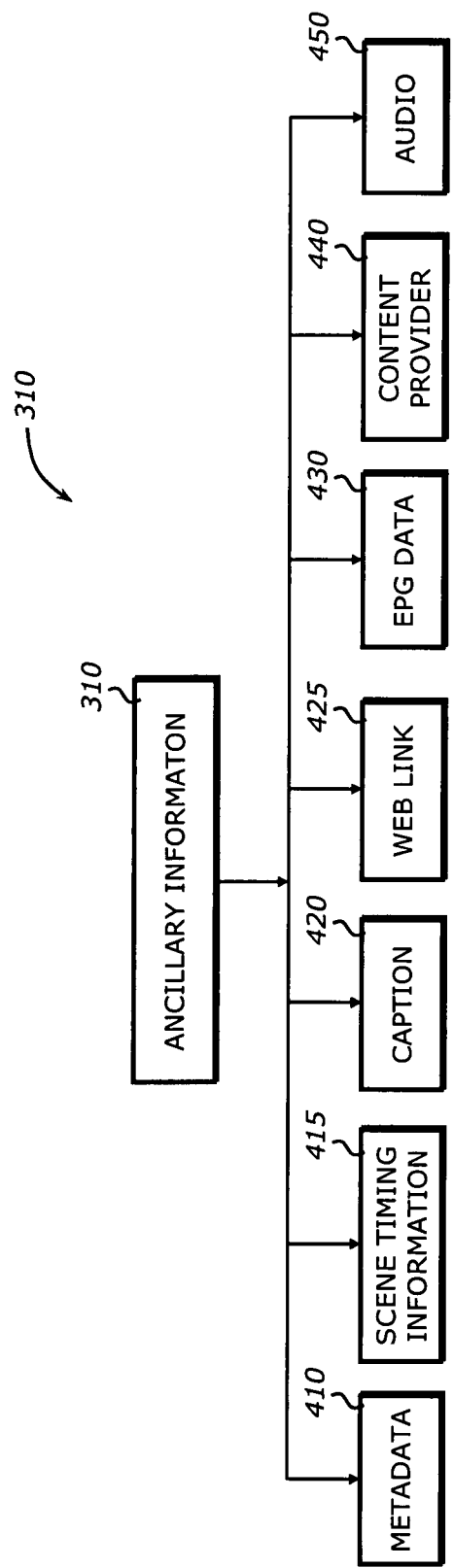
FIG. 4 is a diagram illustrating ancillary information according to one embodiment of the invention.

FIG. 4 is a diagram illustrating the ancillary information 310 according to one embodiment of the invention. The ancillary information 310 includes metadata 410, scene timing information 415, caption 420, Web link 425, EPG data 430, content provider information 440, and audio 450. In addition, any other contextual information that may be accessible by the image content search processor 60 may also be used. The ancillary information provides additional search query or criteria to narrow the search space or refine the search for more accurate results.

The metadata 410 may include any metadata available as part of the broadcast content. It may include program title, synopsis, keywords, genre, type, parental rating, actors, director, credit list, language, production year, production country, creation date, episode number, release information, file format, file size, bit rate, audio attributes (e.g., coding, number of channels), video attributes (e.g., coding, scan), etc. The format of metadata may be Motion Picture Experts Group (MPEG)-7, eXtensible Markup Language (XML), etc. The scene timing information 415 includes timing information regarding scene changes.

The caption 420 includes caption information such as closed captions, subtitles, news ticker, or any textual information displayed on the broadcast content. The Web link 425 provides name or identifier of a Web site that contain information related to the content. For example, it may be a link to a Web site of an official fan site of an actor identified in the ROI, or a company whose product is identified in the ROI, etc. The user may be directed to the Web site from the Web link 425. The EPG data 430 may include any program guide information such as channel number, schedule, time slot, future program, title, genre, pay-per-view information, etc. The content provider information 440 may include any information regarding the content provider or broadcaster such as broadcast station, publisher, etc. The audio 450 may include any audio information embedded within the broadcast content such as audio segments, stream, music, etc.

The ancillary information 310 may be processed or filtered before being submitted together with the ROI 220 to the search 320. The ancillary information 310 may help refine the search or narrow the search space. For example, the metadata 410 may identify the program name as a "National Geographic—Arctic Explorer" program. This information may be useful to add to the query so that the search may focus on the geographical aspects of the image, e.g., relating to the Arctic.

Figure 5:
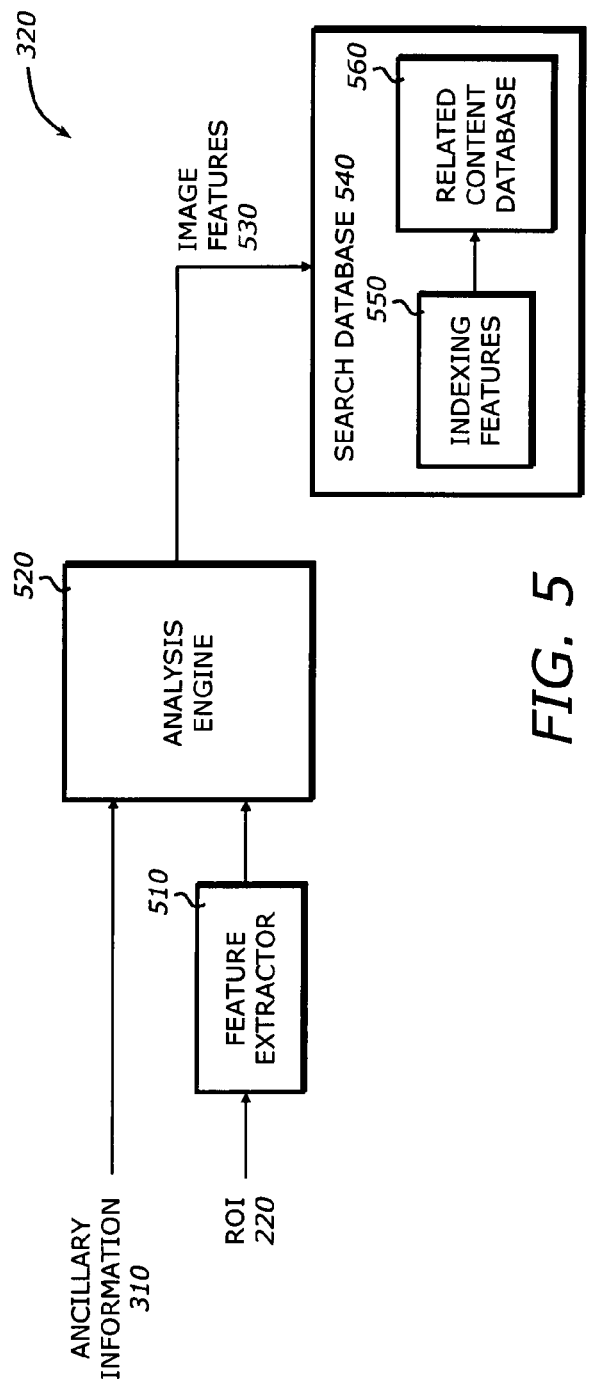
FIG. 5 is a diagram illustrating a local search according to one embodiment of the invention.

FIG. 5 is a diagram illustrating a local search according to one embodiment of the invention. The local search 320 includes a feature extractor 510, an analysis engine 520, and a search database 540.

The feature extractor 510 extracts relevant features of the image contained in the ROI 220. Many techniques in image analysis for feature extraction may be employed including shape analysis, face recognition, etc. The analysis engine 520 is an image analysis processor that processes the features extracted from the feature extractor 510 using the ancillary information 310 if such information is available. The analysis engine 520 may generate image features 530 that are used to search for the related content.

The search database 540 includes indexing features 550 and related content database 560. The indexing features 550 are features that are developed to index the related content database 560. The image features 530 are matched with the indexing features 550 to locate the related content. In one embodiment, when there is a match, the matched indexing features are used to index the related content database so that the corresponding related content may be retrieved. The related content database 560 includes encyclopedic data or information that is organized for information retrieval. The related content may be organized or categorized in any convenient manner, including graphical or textual information.

Figure 6:
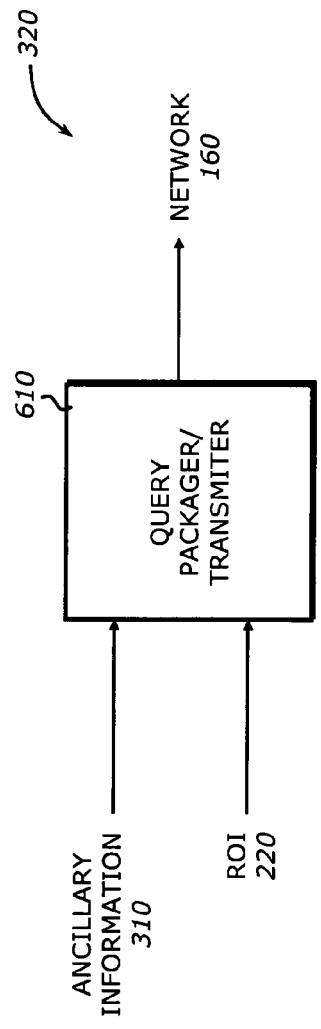
FIG. 6 is a diagram illustrating a remote search according to one embodiment of the invention.

FIG. 6 is a diagram illustrating a remote search according to one embodiment of the invention. The remote search 320 includes a query packager or transmitter 610.

The query packager or transmitter 610 receives the ROI 220 and the ancillary information 310. It formats and packages the received search information into a form compatible for search as required by the server 80. For example, the image contained in the ROI 220 may be converted into proper format such as Joint Photographic Experts Group (JPEG), size, resolution, color encoding, etc.

The query packager or transmitter 610 then transmits the formatted or packaged query to the server 80 via the network 70. The server 80 then feeds the search query into its search engine or engines. The server 80 then obtains the search results from the search engine or engines and returns the related content as contained in the search results back to the image content search processor 60 for transmitting to the viewer 20 for viewing.

Figure 7:
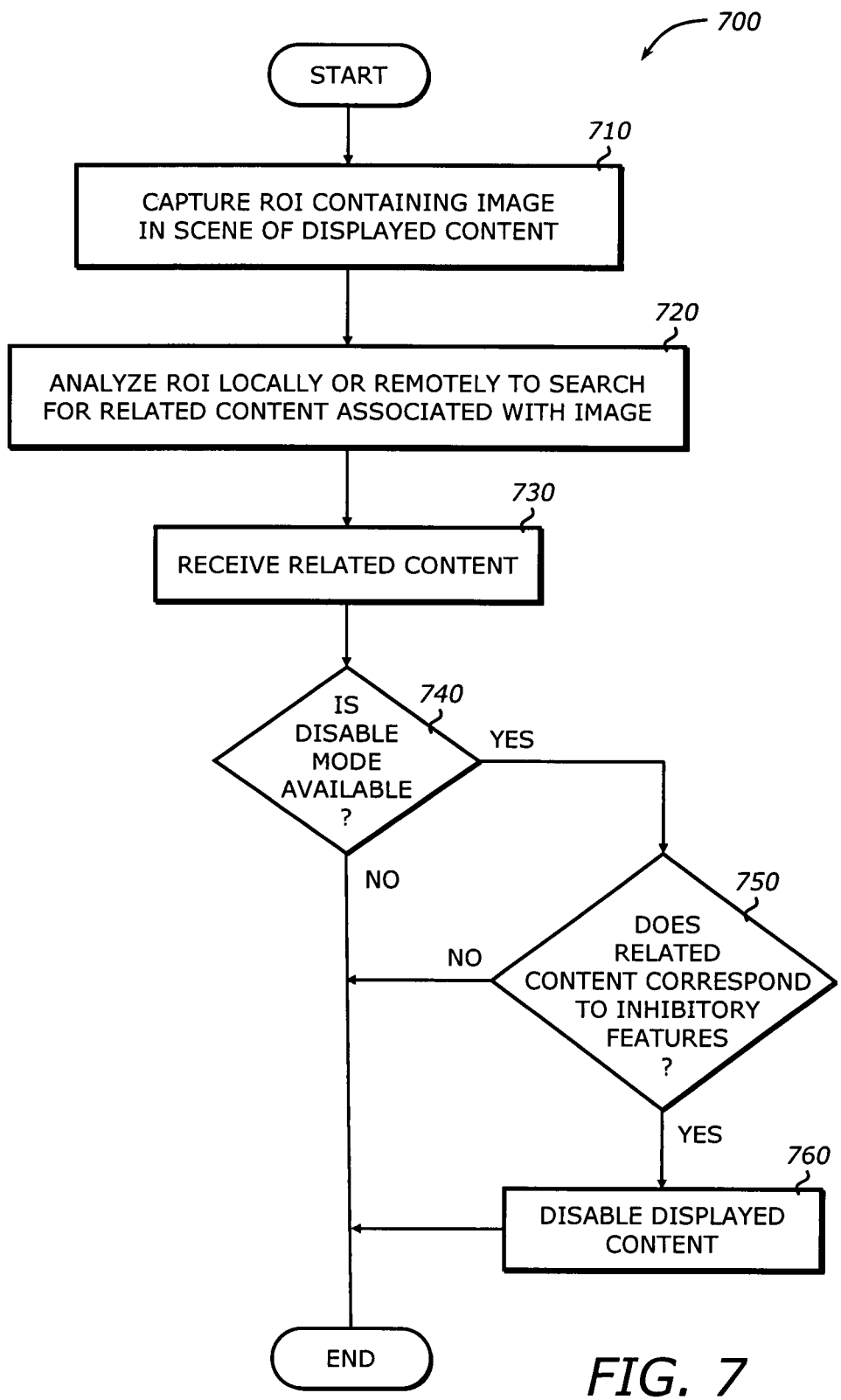
FIG. 7 is a flowchart illustrating a process to perform image content search according to one embodiment of the invention.

FIG. 7 is a flowchart illustrating a process 700 to perform image content search according to one embodiment of the invention.

Upon START, the process 700 captures a region of interest (ROI) containing an image in a scene of a displayed content (Block 710). This may be performed by selecting an area encompassing an object to correspond to the ROI using a wireless pointing device or automatically using some pre-defined area of ROI. Then, the process 700 analyzes the ROI locally or remotely to search for related content associated with the image (Block 720). Next, the process 700 receives the related content (Block 730).

Then, the process 700 determines if a disable mode is available (Block 740). If not, the process 700 is terminated. Otherwise, the process 700 determines if the related content correspond to an inhibitory feature (Block 750). The inhibitory feature may include a parental control or an adult material control. If not, the process 700 is terminated. Otherwise, the process 700 disables the displayed content (Block 760). The process 700 is then terminated. Note that the disable mode of operation is typically performed passively and automatically without user's intervention. For example, blocks 710 through 730 may be performed automatically using some pre-defined ROI.

Figure 8:
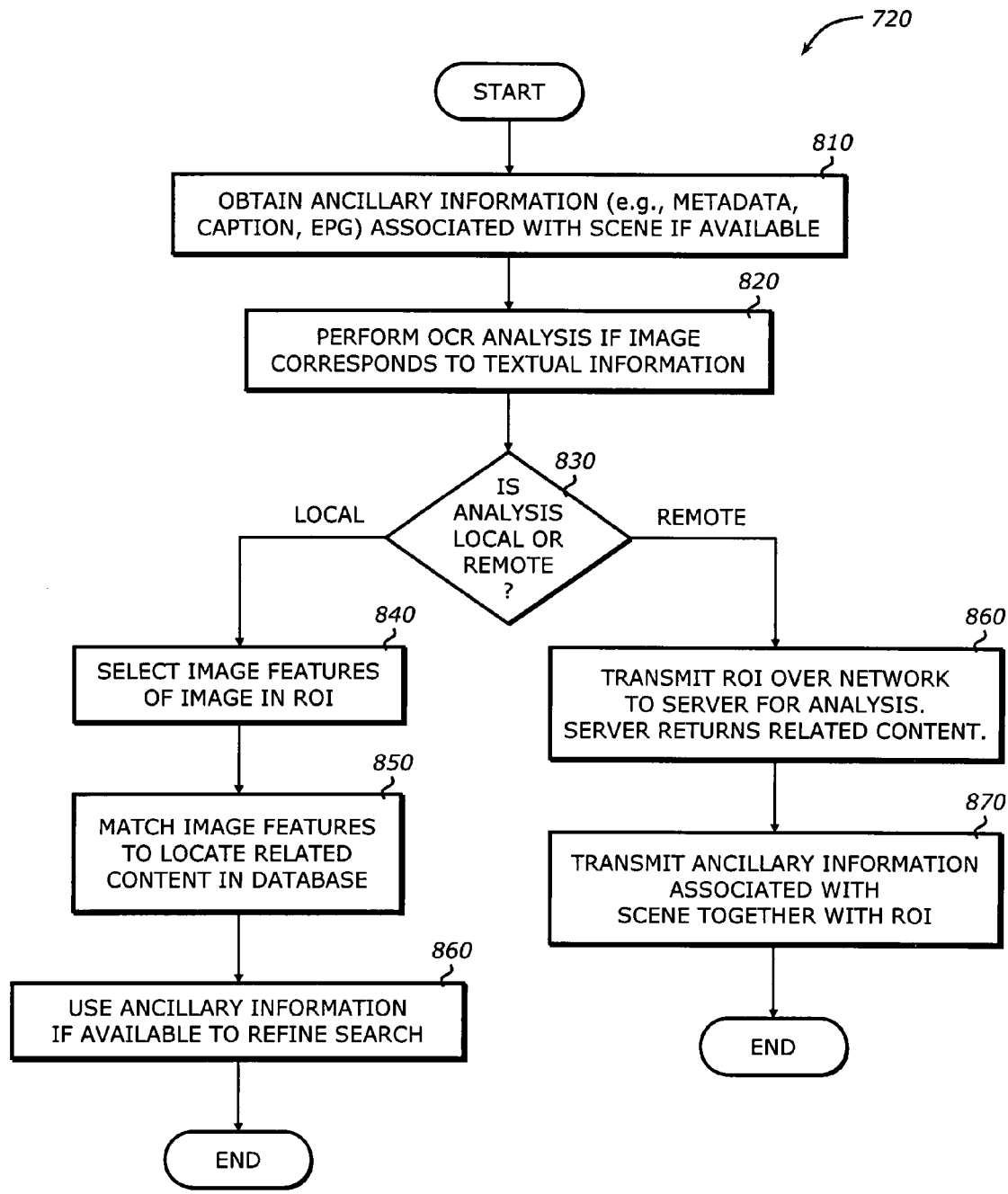
FIG. 8 is a flowchart illustrating a process to analyze a region of interest (ROI) according to one embodiment of the invention.

FIG. 8 is a flowchart illustrating the process 720 to analyze a region of interest (ROI) according to one embodiment of the invention.

Upon START, the process 720 obtains ancillary information associated with the scene if such information is available (Block 810). The ancillary information may include, if available, metadata, caption EPG data, Web link, scene-to-scene timing information, etc. as shown in FIG. 4. Next, the process 720 performs an optical character recognition (OCR) analysis of the image if the image corresponds to textual information (Block 820). Then, the process 720 determines if the analysis is local or remote (Block 830). This may be performed according to the capability of the image content search processor, or the viewer's preference.

If the analysis is local, the process 720 selects image features of the image in the ROI (Block 840). Then, the process 720 matches the image features with indexing features to locate the related content in a database (Block 850). The indexing features index related content contained in the database. Next, the process 720 uses the ancillary information if available to refine the search (Block 860) and is then terminated.

If the analysis is remote, the process 720 transmits the ROI along with the ancillary data over a network to a server for analysis (Block 870). The server returns related content after the analysis. Next, the process 720 transmits the ancillary information associated with the scene together with the ROI if such information is available (Block 880). The process 720 is then terminated.

Elements of one embodiment of the invention may be implemented by hardware, firmware, software or any combination thereof. The term hardware generally refers to an element having a physical structure such as electronic, electro-magnetic, optical, electro-optical, mechanical, electro-mechanical parts, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory, ROM, EPROM). Examples of firmware may include microcode, writable control store, micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable programmable ROM (EPROM), a floppy diskette, a compact disk (CD) ROM, an optical disk, a hard disk, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described above. The machine accessible medium may also include program code embedded therein. The program code may include machine readable code to perform the operations described above. The term "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A computer-implemented method comprising:
capturing a region of interest (ROI) containing an image having an object in a scene of a displayed content on a display screen by a pointing device or a remote control unit, the displayed content being from a broadcast content or a package media for public viewing;
analyzing the ROI to search for related content associated with the image, wherein the related content includes additional information that further describes the object in the scene;
receiving the related content;
obtaining ancillary information associated with the scene that contains the region of interest (ROI), the ancillary information including at least one of a Web link, scene timing information, caption, electronic program guide (EPG) data, audio segment; and searching for the related content using the ancillary information.

2. The method of claim 1 wherein capturing the ROI comprises:

highlighting the object in the scene to correspond to the ROI using the pointing device or remote control unit.

3. The method of claim 1 wherein the ROI is analyzed locally and analyzing locally comprises:

selecting image features of the image in the ROI; and matching the image features to locate the related content.

4. The method of claim 1 wherein the ROI is analyzed remotely and analyzing the ROI remotely comprises:

transmitting the ROI over a network to a server for analysis, the server returning the related content.

5. The method of claim 4 wherein analyzing the ROI remotely further comprises:

the obtaining of ancillary information associated with the scene that contains the region of interest (ROI); and transmitting the ancillary information together with the ROI.

6. The method of claim 1 wherein receiving the related content comprises:

displaying the scene of the displayed content on the display screen of a television and displaying the related content on a wireless device having a display.

7. The method of claim 1 wherein the related content further comprises a query to ask a viewer to narrow results of the search for related content associated with the image.

8. The method of claim 1 further comprising:

disabling the broadcast content if the related content corresponds to an inhibitory feature.

9. The method of claim 1 wherein analyzing the ROI comprises:

performing an optical character recognition (OCR) analysis if the image has textual information used to help identifying the image.

10. An article of manufacture comprising:

a machine-accessible non-transitory storage medium including data that, when accessed by a machine, cause the machine to perform operations comprising:

capturing a region of interest (ROI) containing an image in a scene of a displayed content, the displayed content being from a broadcast content or a package media for public viewing;

analyzing the ROI to search for related content associated with the image, wherein the related content includes additional information that further describes the object in the scene;

receiving the related content;

wherein the data causing the machine to perform analyzing the ROI locally further comprises data that, when accessed by a machine, cause the machine to perform operations comprising:

obtaining ancillary information associated with the scene that contains the region of interest (ROI), the ancillary information including at least one of a Web link, scene timing information, caption, electronic program guide (EPG) data, audio segment; and searching for the related content using the ancillary information.

11. The article of manufacture of claim 10 wherein the data causing the machine to perform capturing the ROI comprises data that, when accessed by a machine, cause the machine to perform operations comprising:

highlighting an object in the scene to correspond to the ROI using a remote control unit.

12. The article of manufacture of claim 10 wherein the data causing the machine to perform analyzing the ROI locally comprises data that, when accessed by a machine, cause the machine to perform operations comprising:

selecting image features of the image in the ROI; and matching the image features to locate the related content.

13. The article of manufacture of claim 10 wherein the data causes the machine to perform analyzing the ROI remotely which comprises data that, when accessed by a machine, cause the machine to perform operations comprising:

transmitting the ROI over a network to a server for analysis, the server returning the related content.

14. The article of manufacture of claim 13 wherein the data causing the machine to perform analyzing the ROI remotely further comprises data that, when accessed by a machine, cause the machine to perform operations comprising:

obtaining the ancillary information; and transmitting the ancillary information together with the ROI.

15. The article of manufacture of claim 10 wherein the data causing the machine to perform receiving the related content comprises data that, when accessed by a machine, cause the machine to perform operations comprising:

displaying the scene of the displayed content on a display screen of a television and displaying the related content on a wireless device having a display.

16. The article of manufacture of claim 10 wherein the data causing the machine to perform displaying the related content comprises data that, when accessed by a machine, cause the machine to perform operations comprising:

displaying the related content that comprises displaying a query to ask a viewer to narrow results of a search for the related content.

17. The article of manufacture of claim 10 wherein the data further comprises data that, when accessed by a machine, cause the machine to perform operations comprising:

disabling the displayed content if the related content corresponds to an inhibitory feature.

18. The article of manufacture of claim 10 wherein the data causing the machine to perform analyzing the ROI comprises data that, when accessed by a machine, cause the machine to perform operations comprising:

performing an optical character recognition (OCR) analysis if the image has textual information used to help identifying the image.

19. A system comprising:

a display device to display a displayed content, the displayed content being from a broadcast content or a package media for public viewing;

and an integrated receiver and decoder (IRD) coupled to the display device to receive the displayed content, the IRD including an image content search processor to perform operations comprising:

capturing a region of interest (ROI) containing an image in a scene of the displayed content, analyzing the ROI to search for related content associated with the image, wherein the related content includes additional information that further describes the object in the scene, receiving the related content; and wherein the analyzing the ROI uses ancillary information associated with the scene that contains the region of interest (ROI) to search for the related content, the ancillary information including at least one of a Web link, scene timing information, caption, electronic program guide (EPG) data, audio segment.

20. The system of claim 19 comprising a remote control unit to allow the viewer to select an area encompassing an object in the scene to correspond to the ROI.

21. The system of claim 19 wherein the image content search processor comprises a local search processor, the local search processor comprising:
- a feature extractor to extract image features of the image in the ROI;
- an analysis engine coupled to the feature extractor to generate image features representing a query; and
- a search database coupled to the analysis engine to match the image features to locate the related content.

22. The system of claim 19 wherein the image content search processor comprises a remote search processor, the remote search processor comprising:
- a query packager to package the ROI and ancillary information if available for transmission to a server via a network.

23. The system of claim 19 wherein the image content search processor is configured with executable instructions to present related content on a wireless device having a display while displaying the displayed content on the display device.

24. The system of claim 23 wherein the related content further comprises a query requesting an action by the viewer using a remote control unit.

25. The system of claim 19 wherein the image content search processor accesses executable instructions to configure the image content search processor to disable the displayed content if the related content corresponds to an inhibitory feature.

26. The system of claim 19 wherein the image content search processor accesses executable instructions to configure the image content search processor to perform an optical character recognition (OCR) analysis if the image has textual information used to help identifying the image.

27. A system comprising:
- a content receiver (CR) that provides a source of a displayed content from a broadcast content for public viewing;
and
- a display device coupled to the CR to display the displayed content, the display device including an image content search processor to perform operations comprising:
- capturing a region of interest (ROI) containing an image in a scene of the displayed content,
- analyzing the ROI to search for related content associated with the image, wherein the related content includes additional information that further describes the object in the scene, and
- receiving the related content wherein analyzing the ROI includes using ancillary information associated with the scene that contains the region of interest (ROI) to search for the related content, the ancillary information including at least one of a Web link, scene timing information, caption, electronic program guide (EPG) data, audio segment.

28. The system of claim 27 wherein the CR is built into a television set.

* * * * *